United States Patent

[11] 3,612,391

[72] Inventor Stellan P. Knoos
  Malibu, Calif.
[21] Appl. No. 690,172
[22] Filed Dec. 13, 1967
[45] Patented Oct. 12, 1971
[73] Assignee National Aeronautics & Space Administration

[54] SHOCK TUBE BYPASS PISTON TUNNEL
  17 Claims, 8 Drawing Figs.
[52] U.S. Cl. ................................................. 230/54, 230/221
[51] Int. Cl. ........................................ B65d 31/00
[50] Field of Search ............................ 230/56, 54, 49, 221; 103/52, 44, 54, 52 A; 188/88, 501, 88.5

[56] References Cited
UNITED STATES PATENTS
2,938,466  5/1960  King ............................. 103/44

Primary Examiner—Robert M. Walker
Attorneys—Leonard Rawicz, John B. Farmakides, Alvin S. Bass, John H. Warden and Paul McCaul ABSTRACT: A gas, preferably preheated, is released in a tube having a free piston, a piston bypass structure, and a vacuum chamber. In operation, a portion of this gas bypasses the piston into the vacuum chamber. The gas which is not bypassed brings the piston into motion to automatically close the bypass and then compress the bypassed gas and build up a very high temperature and pressure in the bypassed gas. A second, perforated, piston may be initially placed downstream of the first piston to increase system efficiency and act as a safety device.

INVENTOR:
Stellan P. Knöös

By William W. Rundle
AGENT

INVENTOR:
Stellan P. Knöös

By William W. Rundle
AGENT

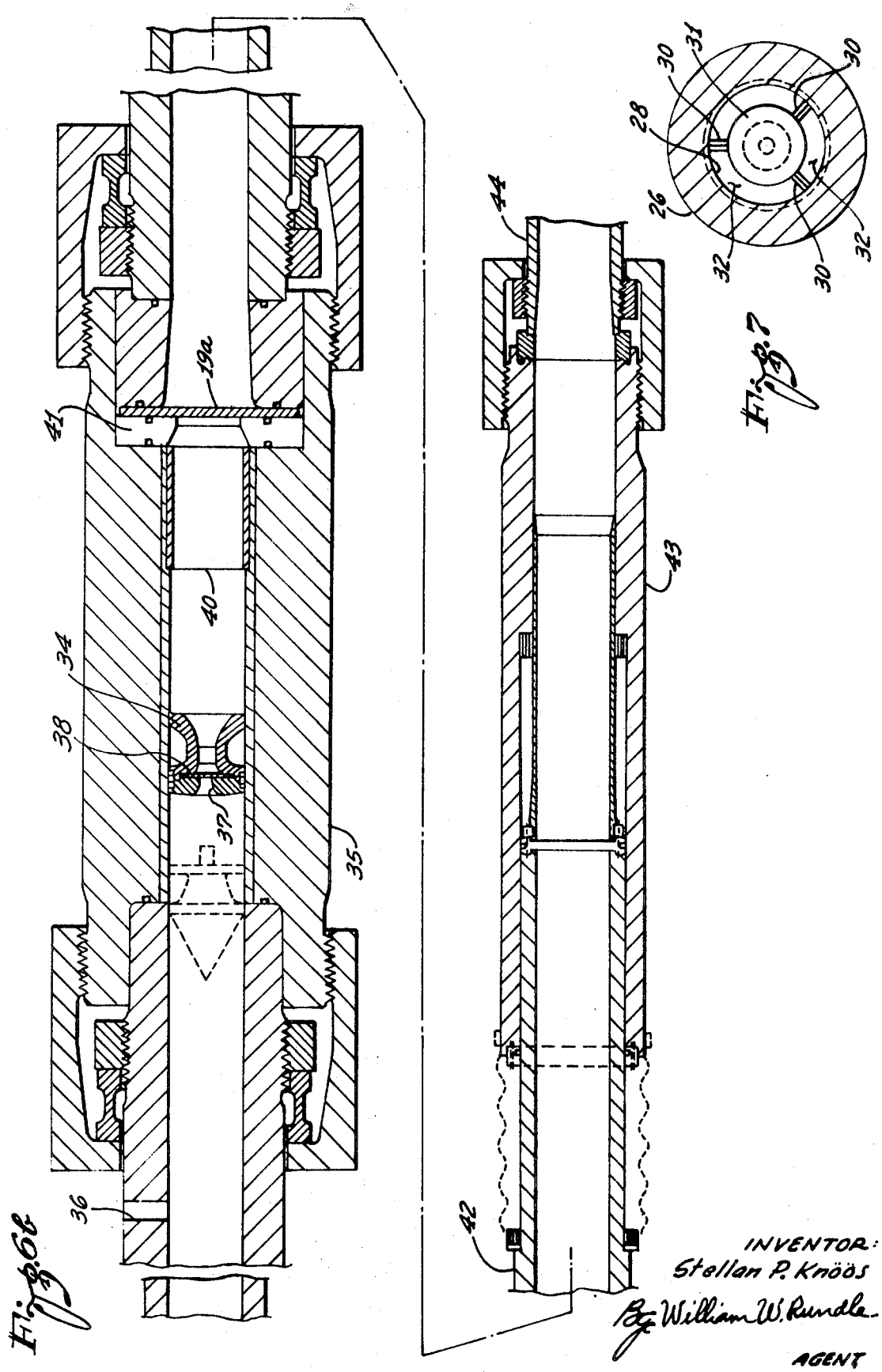

SHOCK TUBE BYPASS PISTON TUNNEL

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435, 42 U.S.C. 2457).

Free-moving piston compressors are well known in the art for producing a high-pressure gas to use for various purposes, such as to launch a projectile at high speed, for example. However, the performance of conventional devices is limited to about 5,000° K. peak gas temperature.

It is an object of the present invention to provide a means and method of generating temperatures above 20,000° K. and pressures exceeding several thousand atmospheres in a gas.

Briefly as to method, my invention comprises increasing the enthalpy and entropy of a gas by a process involving supplying a preferably preheated pressurized gas, by means of shock compression for example, bringing such gas into rapid contact with a free piston initially at rest, bypassing a portion of the gas to the opposite side of the piston into an initially evacuated chamber, and then sealing off the chamber from further gas entrance and allowing the moving piston to further heat and compress the bypassed gas under force of the remaining non-bypassed gas.

Briefly as to apparatus, my invention comprises a tube closed at one end, a free piston spaced from this one end, piston bypass means from one point in the tube to another lengthwise thereof, and means for feeding preferably hot high-pressure gas to the side of the piston opposite the closed tube end, the portion of the tube from the bypass means to the closed end being initially evacuated. The closed end of the tube may be effectively opened at the desired moment, as by a bursting diaphragm, to utilize the highly heated and compressed gas which has bypassed the piston, to perform a desired work function. In an advanced or preferred embodiment, a separate driver gas and additional bursting diaphragm are provided on the upstream or input side of the piston, to produce initial shock wave heating and pressurization of the gas. Further, the invention includes a second piston initially positioned downstream of the first piston. This second piston has an axial passage therethrough which preferably contains an additional frangible diaphragm.

The present invention will be more fully understood from the detailed description of specific techniques and apparatus to follow, and by reference to the accompanying illustrative drawings, wherein.

FIG. 6, in two parts 6a and 6b, is a longitudinal section view of an actual working model of the present invention, showing further details and features.

Figure 6A:
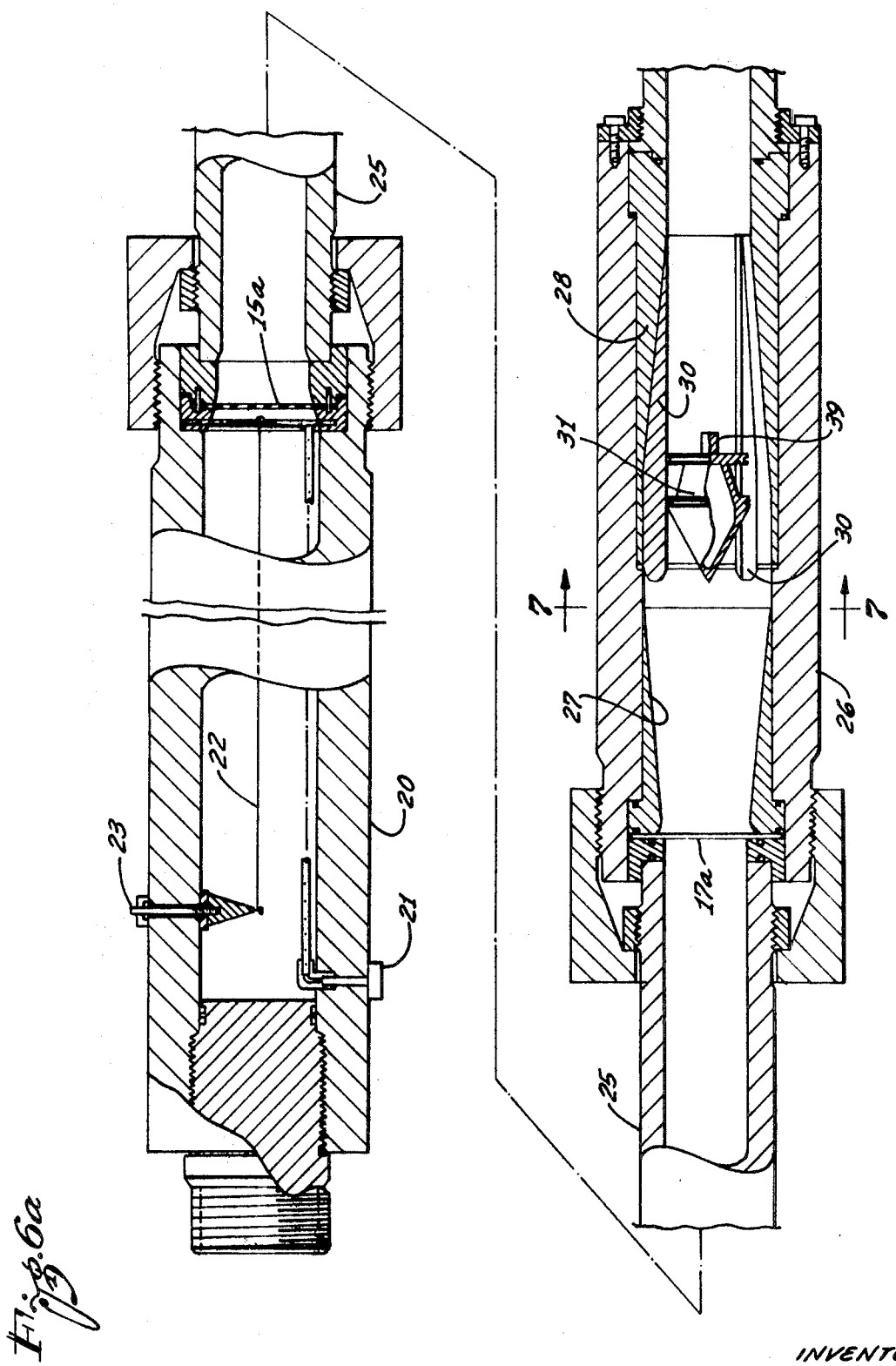

FIG. 7 is a cross section as indicated by section line 7—7 in FIG. 6a, showing interior of the bypass section and piston rails.

Figure 1:
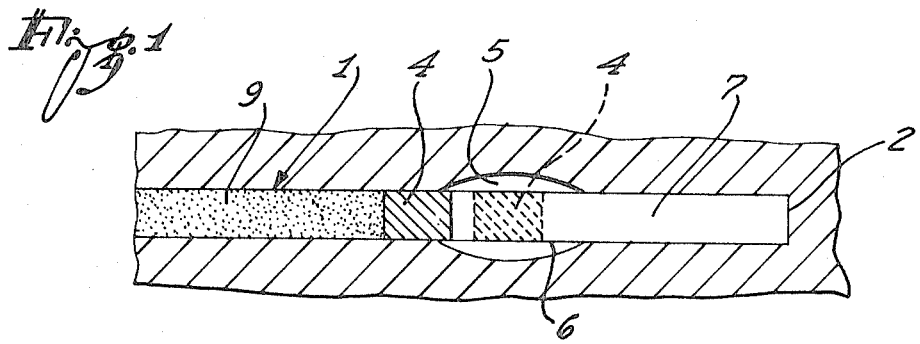
FIG. 1 is a schematic elevation view of the present invention in simplified form showing the components and gas in two alternate starting positions.

Referring first to FIG. 1 for a detailed description of this invention, a tube 1 with a first end 2 closed is provided with a free-moving piston 4 at rest. Between the tube ends, there is a piston bypass channel 5 comprising simply a section of larger cross-sectional area provided with piston guide means 6. Between the closed end 2 and bypass channel 5, an initially evacuated compression chamber 7 is provided, and a gas charge 9 is supplied in the other end of tube 1 as will be described later. The solid-line position of piston 4 may be the starting position, or the dotted-line position of piston 4 may be an alternate starting position if the gas charge 9 is not permitted to travel to the bypass channel 5 until the desired operating time, such as by incorporating a diaphragm-type closure (not shown) in the tube 1 just ahead of the bypass channel.

Figure 2:
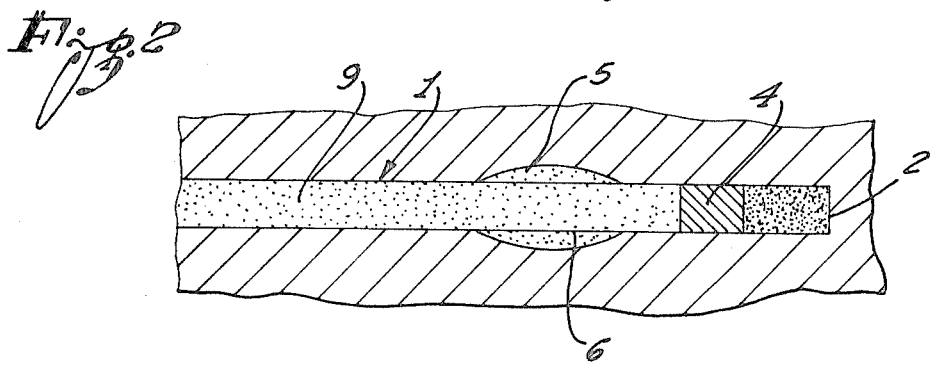
FIG. 2 is a view similar to FIG. 1, showing the action of the elements in a later operating position and condition.

To start operation, the gas charge 9 is permitted to act on the piston 4 and start it in motion; or, alternately, the gas will reach the bypass channel 5 before contacting the piston. In either case, a portion of gas charge 9 flows through bypass channel 5 around the piston 4, and piston motion is started. The piston passes this channel and continues to accelerate, decreasing the volume available for the bypassed gas in chamber 7. Later, the piston decelerates and transfers its kinetic energy to the bypassed gas, as illustrated in FIG. 2. When the piston reaches its maximum or "bounce" position near the tube end 2, the bypassed gas has been heated and raised to a high pressure.

Figure 3:
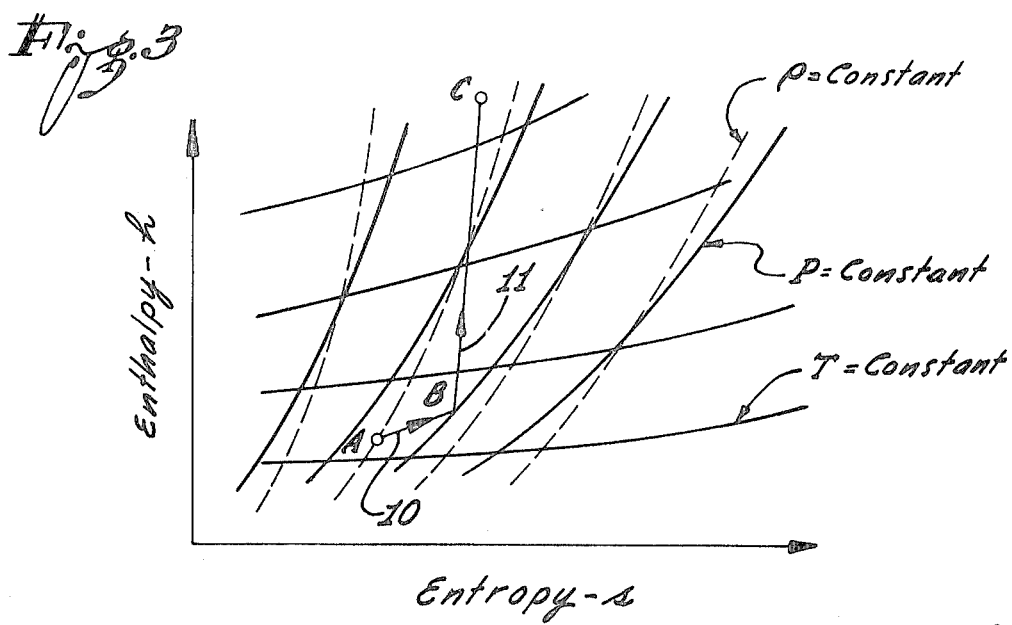
FIG. 3 is a brief Mollier diagram, showing thereon the idealized changes in thermodynamic state of the gas in FIGS. 1 and 2.

FIG. 3 illustrates the idealized changes of thermodynamic states the gas goes through in the present process. The initial state of gas in the charge 9 corresponds to point A in this Mollier diagram. As the gas expands through the bypass channel 5 to fill the evacuated chamber 7, entropy is produced in the gas and the internal energy of the gas is increased due to the pressure work done on it by the gas portion which does not pass the piston 4, if energy losses to the tube walls are sufficiently small. This process is indicated by the line 10 on the chart to intermediate point B. In reality, the change of state is not continuous as indicated by line 10, but this diagram is shown to explain the process in a general way.

After reaching point B, when injection of bypass gas into the chamber 7 has been completed by closure of the bypass channel 5, more-or-less isentropic heating of the gas is performed by motion of piston 4 into chamber 7 until the forward piston motion is stopped by the retarding force of the compressed gas. This second change of state of the gas is schematically represented by a second line 11 in FIG. 3, going to a peak temperature and pressure at point C. Assuming the gas in chamber 7 is confined until this peak "bounce" position of the piston occurs, the peak pressure is typically four to 15 times the initial pressure of charge 9 before bypass, and the peak temperature (Kelvin) is two to eight times the corresponding initial temperature.

The peak gas temperature depends upon gas properties and also upon the amount of gas bypassed, the length of compression chamber 7, and the pressure of the gas acting behind the piston. The portion of gas bypassed is easily controlled such as by varying the piston mass in relation to the gas pressure acting on it, the piston shape and initial position, and the geometry of the bypass channel 5.

Figure 4:
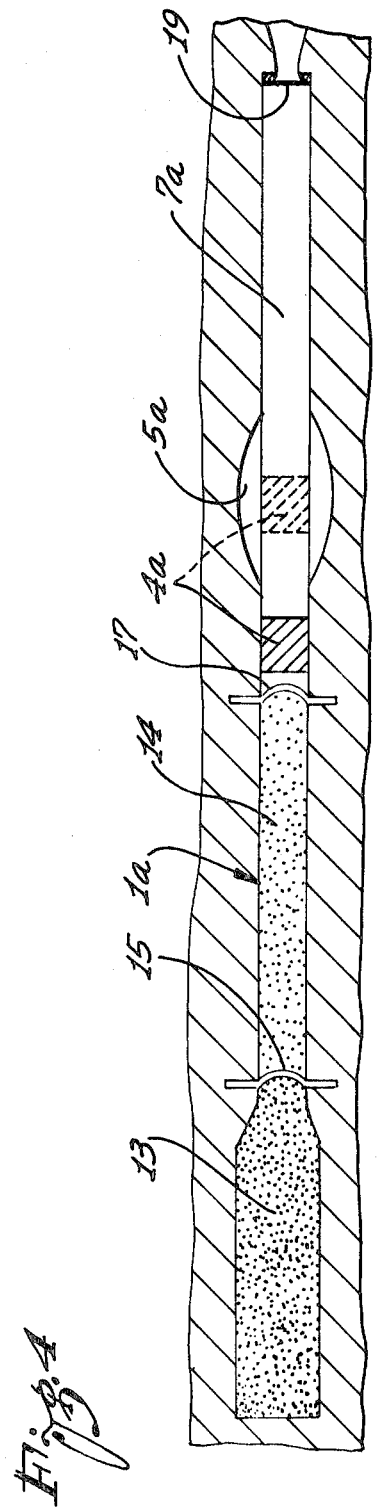
FIG. 4 is a schematic elevation view of a possible modification of the device of FIG. 1, utilizing a shock tube for initial heating of the gas, and showing initial conditions before gas release.

In a preferred embodiment, the arrangement of FIG. 4 is used to produce and/or inject a high-temperature gas at the input side of the piston in the present invention. FIG. 4 shows a tube 1a, piston 4a at either of the two alternate starting positions, bypass channel 5a and initially evacuated compression chamber 7a, all similar to the corresponding elements in FIG. 1. In addition, a driver gas 13 is provided, to expand into a driven gas 14, the latter taking the place of the gas charge 9 of FIG. 1. Driver gas 13 may comprise hot combustion products of hydrogen and oxygen, for example, preferably diluted with helium, and the driven gas 14 may be helium at a much lower pressure and temperature than that of the driver gas 13 at the reaction state of the latter.

Figure 5:
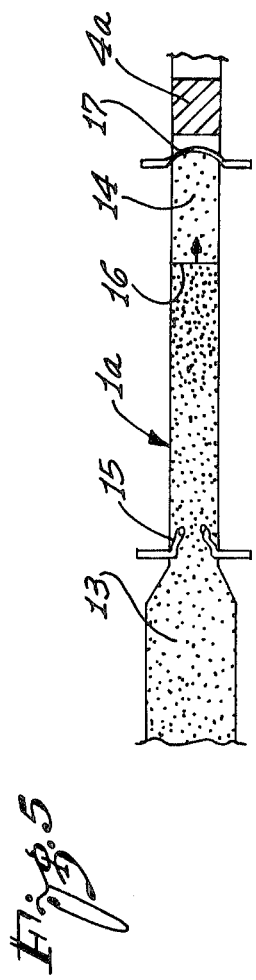
FIG. 5 is a partial view of the FIG. 4 device, showing operation in the shock tube section thereof.

Driver gas 13 is initially separated from driven gas 14 by a first diaphragm 15. Heating is obtained in a known manner by the breaking of the first diaphragm 15 at a predetermined value of pressure, whereupon driven gas 14 is heated and compressed under large entropy increase, by the shock and compression wave system that occur when driver gas 13 expands into it. An incident shock wave 16 is shown schematically in FIG. 5 during this phase of the operation.

A second diaphragm 17 is preferably provided ahead of piston 4a and bypass channel 5a to contain the initial driven gas 14 and to prevent the piston 4a from moving under the initial loading pressure of driven gas 14. If no second diaphragm 17 is used, piston 4a will be placed in its solid-line starting position as shown in FIGS. 1 and 4, and be sealed against the walls of tube 1a enough to resist the light initial load of the driven gas 14.

The impact of the incident shock wave 16 on second diaphragm 17 breaks it, and the heated gas then rushes to the piston 4a and to the bypass channel 5a. The bypass process and final heating of gas in the compression chamber 7a are accomplished as described previously. An outlet diaphragm 19 is provided in the end of vacuum chamber 7a. This diaphragm 19 should be designed to rupture or be opened at a pressure slightly lower than peak, to feed the hot high-pressure gas to the utilization device (not shown). The frangible diaphragms in this device may be of metal, preferably scribed to form a desired burst geometry.

A sufficient length of the tube section containing the driven gas 14 is provided so that the bypassed gas compressed by the piston 4a will have essentially none of the driver gas 13 mixed in with the driven gas.

In FIGS. 6 and 7, a typical actual design of a bypass piston device for production of strong shock waves in arbitrary gases is shown. At the left end of FIG. 6a, a gas chamber 20 having a first diaphragm 15a contains a driver gas as described for FIG. 4. A gas mixture of, for example, 7 parts helium, 2 parts hydrogen, and 1 part oxygen is introduced through a gas injection port 21.

An ignition wire 22 is provided in this section, together with an insulated connection terminal 23, so that by causing a large current from an electrical circuit (not shown) to flow in this wire 22, the combustible gas mixture will ignite to produce a higher temperature and pressure, thus initiating operation of the system.

A shock tube section 25 preferably contains a driven gas such as helium initially at room temperature, and a second diaphragm 17a. After breaking of first diaphragm 15a, the ensuing shock wave traveling through the helium in shock tube section 25 will rupture the second diaphragm 17a. Beyond second diaphragm 17a is a bypass section 26 containing two substantially conical liners 27 and 28 which give the bypass channel the proper desired geometry. Three piston guide rails 30 are fixed to the downstream liner 28, as further shown in FIG. 7. A primary piston 31 is initially positioned as shown within the guide rails 30. It is thus seen that when the second diaphragm 17a ruptures, the shock-heated helium gas will start accelerating the piston 31 and a portion of the gas will flow around the piston in spaces 32 between the rails 30. As the accelerated piston reaches the end of the rails 30, the spaces 32 within the tapering second liner 28 have been passed to thereby shut off bypass gas.

The embodiment shown in FIG. 6 also contains a second piston 34 in an initially evacuated compression chamber 35 between the bypass section 26 and the outlet diaphragm 19a. A vacuum port 36 is provided in the wall of this chamber 35. The second piston 34 is preferably heavier than the primary piston 31, and has a central passage containing an inlet throat 37 and a frangible piston diaphragm 38. A typical initial position of the second piston 34 may be at about 75 percent of the length of the compression chamber 35 from its upstream end.

The approach of the primary piston to the second is relatively rapid due to the heavier weight of the second, which may be five times that of the primary piston 31, for example. Piston diaphragm 38 should be designed to break just before the primary piston 31 would reverse direction due to the pressure force of the trapped gas between the two pistons. The passage area through the second piston 34 is small compared to the full tube cross section area. (A plug 39 on the primary piston 31 may be used to dock smoothly with the throat 37 of the second piston 34.) Thus, kinetic energy of the primary piston 31 is transferred to the bypassed gas. The two pistons thereafter move together and further heat and compress the gas until outlet diaphragm 19a opens. In order to produce a maximum working pressure downstream, the outlet diaphragm 19a is again designed to break just before the peak "bounce" pressure is reached.

The advantages of incorporating a second, perforated, piston 34 are that it increases the entropy of the gas, while at the same time providing a safety feature.

At the end of the piston stroke, a residual energy absorber in the form of an enclosed soft hollow tube 40 and a die ring 41 is preferably provided as a further safety feature to prevent damage to major components in case of a premature rupture of diaphragm 19a.

Downstream from outlet diaphragm 19a is a suitable length of tubing for containing a desired gas to be shock-heated. This example shows a buffer tube having sliding joint sections 42 and 43 leading into a test section tube 44 (partially shown). The entire apparatus of FIGS. 6a and 6b may be mounted on a suitable support rail structure. The present invention actually ends with the outlet diaphragm 19a. Any desired utilization device can be provided beyond this point. For example, such thermodynamic gas states as the present invention produces are highly desirable for a pressure-driven shock tube, for launching projectiles at high speeds, or for heating of gases to be expanded in hypersonic nozzles or wind tunnels.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. The method of producing high temperatures and pressures in a gas comprising bringing said gas into rapid contact with a free piston to start accelerating said piston, bypassing a portion of said gas around said accelerating piston to a closed vacuum chamber ahead of said piston, shutting off the flow of bypass gas around said piston, and continuing to allow gas pressure on said piston to compress said bypassed gas.

2. Method in accordance with claim 1 including initially heating and pressurizing said gas to desirable amounts above ambient conditions before driving it into said piston.

3. Method in accordance with claim 1 including preventing said piston from bouncing backward from the position of peak compression.

4. A device for producing extremely high temperatures and pressures in a gas, comprising a tube, a free piston slidable in said tube, bypass means positioned along a portion of said tube to allow gas to flow around said piston from one side to the other only when said piston is within the length of said bypass means, and means for admitting gas under pressure in one end of said tube to one side of said piston.

5. Apparatus in accordance with claim 4 wherein the other end of said tube forms an evacuated chamber.

6. Apparatus in accordance with claim 4 wherein said bypass means comprises a length of enlarged cross section area in said tube, and including piston guide means through said length.

7. Apparatus in accordance with claim 4 wherein said gas admitting means includes means for producing shock waves in said gas striking said piston.

8. Apparatus in accordance with claim 4 wherein the other end of said tube is closed at a desired distance from said bypass means, and including frangible means in said closed end, said frangible means designed to rupture at a pressure below the bounce pressure otherwise attainable.

9. Apparatus in accordance with claim 4 including a second free piston positioned downstream of the first said piston, said second piston having a longitudinal passage therethrough.

10. Apparatus in accordance with claim 9 wherein said second piston has frangible means initially closing said passage.

11. Apparatus in accordance with claim 9 wherein said second piston has an inlet throat in said passage, and the first said piston has a projecting plug on the downstream end thereof for smooth docking with said throat of said second piston.

12. Apparatus in accordance with claim 4 including an initial charge of driven gas at relatively low pressure in said tube on said one side of said piston, and a source of relatively high-pressure driver gas on the opposite side of said initial charge from said piston.

13. Apparatus in accordance with claim 12 including frangible means initially separating said driver gas from said driven gas.

14. Apparatus in accordance with claim 13 including further frangible means initially separating said driven gas from said piston.

15. Means for producing extremely high temperatures and pressures in a gas, comprising
   a. a tube;
   b. a free piston slidable in said tube;
   c. bypass means positioned along a portion of said tube to allow gas to flow around said piston in only a predetermined range of travel of said piston;
   d. said tube having one end initially closed;
   e. a charge of gas in the other end of said tube;
   f. means initially preventing said gas from flowing through said bypass means and from moving said piston; and
   g. means for bringing said gas into rapid accelerating contact with said piston to move it adjacent said bypass means where only a portion of said gas will bypass said piston, said piston moving farther under the action of said gas toward said initially closed tube end to thereby heat and compress said bypassed gas.

16. In a compression tube or the like, the combination of a primary free-moving piston in said tube, a second free-moving piston in said tube downstream from said primary piston, said second piston having a longitudinal passage therethrough, and a frangible diaphragm in said second piston initially closing said passage, said diaphragm designed to open at a slightly lower pressure than the otherwise attainable peak pressure between said pistons.

17. In a compression tube or the like, the combination of a primary free-moving piston in said tube, a second free-moving piston in said tube downstream from said primary piston, said second piston having a longitudinal passage therethrough, and a frangible high-pressure diaphragm initially closing the end of said tube downstream from said second piston, said high-pressure diaphragm designed to open at a high pressure below the peak pressure otherwise attainable on it.